(12) United States Patent
Kobayashi

(10) Patent No.: US 8,610,320 B2
(45) Date of Patent: Dec. 17, 2013

(54) LINEAR GENERATOR HAVING A FLUID PRESSURE CYLINDER STRUCTURE

(76) Inventor: Takaitsu Kobayashi, Chiba (JP)

(\*) Notice: Subject to any disclaimer, the term of this patent is extended or adjusted under 35 U.S.C. 154(b) by 353 days.

(21) Appl. No.: 12/811,719

(22) PCT Filed: Jan. 27, 2009

(86) PCT No.: PCT/JP2009/051256
§ 371 (c)(1),
(2), (4) Date: Jul. 6, 2010

(87) PCT Pub. No.: WO2009/098970
PCT Pub. Date: Aug. 13, 2009

(65) Prior Publication Data
US 2010/0277012 A1    Nov. 4, 2010

(30) Foreign Application Priority Data
Feb. 7, 2008  (JP) .................... 2008-027923

(51) Int. Cl.
*H02K 35/02* (2006.01)
*F02B 63/04* (2006.01)
*H02K 35/00* (2006.01)
*H02K 33/16* (2006.01)

(52) U.S. Cl.
USPC .............. 310/30; 310/14; 310/34; 123/46 E

(58) Field of Classification Search
USPC ............ 310/15–17, 19, 21–39, 12.01–12.33, 310/181
IPC ............ H02K 35/00,35/02, 35/04, 35/06, 33/16
See application file for complete search history.

(56) References Cited

U.S. PATENT DOCUMENTS

| | | | | |
|---|---|---|---|---|
| 5,788,003 | A * | 8/1998 | Spiers | 180/65.245 |
| 6,199,519 | B1 * | 3/2001 | Van Blarigan | 123/46 R |
| 6,326,706 | B1 * | 12/2001 | Zhang | 310/12.31 |
| 6,748,907 | B2 * | 6/2004 | Malmquist et al. | 123/46 E |
| 7,082,909 | B2 * | 8/2006 | Graf et al. | 123/46 E |
| 7,318,506 | B1 * | 1/2008 | Meic et al. | 123/46 R |
| 2003/0024492 | A1 | 2/2003 | Malmquist et al. | |
| 2005/0057101 | A1 * | 3/2005 | Nakagawa et al. | 310/12 |
| 2007/0040457 | A1 * | 2/2007 | Shimizu et al. | 310/15 |
| 2007/0108850 | A1 * | 5/2007 | Chertok | 310/15 |

FOREIGN PATENT DOCUMENTS

| | | |
|---|---|---|
| JP | 05-176501 | 7/1993 |
| JP | 2002-125357 | 4/2002 |
| JP | 2003-518358 | 6/2003 |
| JP | 2005-318708 | 11/2005 |

OTHER PUBLICATIONS

International Search Report issued Mar. 10, 2009 in International (PCT) Application No. PCT/JP2009/051256.

\* cited by examiner

*Primary Examiner* — Burton Mullins
*Assistant Examiner* — Michael Andrews
(74) *Attorney, Agent, or Firm* — Wenderoth, Lind & Ponack, L.L.P.

(57) ABSTRACT

A linear generator has a fluid pressure cylinder structure for reciprocating a piston in a cylinder in the axial direction by applying alternately a fluid pressure in a left fluid pressure chamber in contact with the left end wall of the cylinder and a fluid pressure in a right fluid pressure chamber in contact with the right end wall of the cylinder to the piston. A permanent magnet band is formed between the left and right pressure receiving surfaces of the piston, and an electromotive coil band provided over the left and right fluid pressure chambers is formed on the cylindrical wall between the left and right end walls of the cylinder so that power generation in the electromotive coil band is induced by the reciprocating movement in the axial direction of the piston having the permanent magnet band.

7 Claims, 11 Drawing Sheets

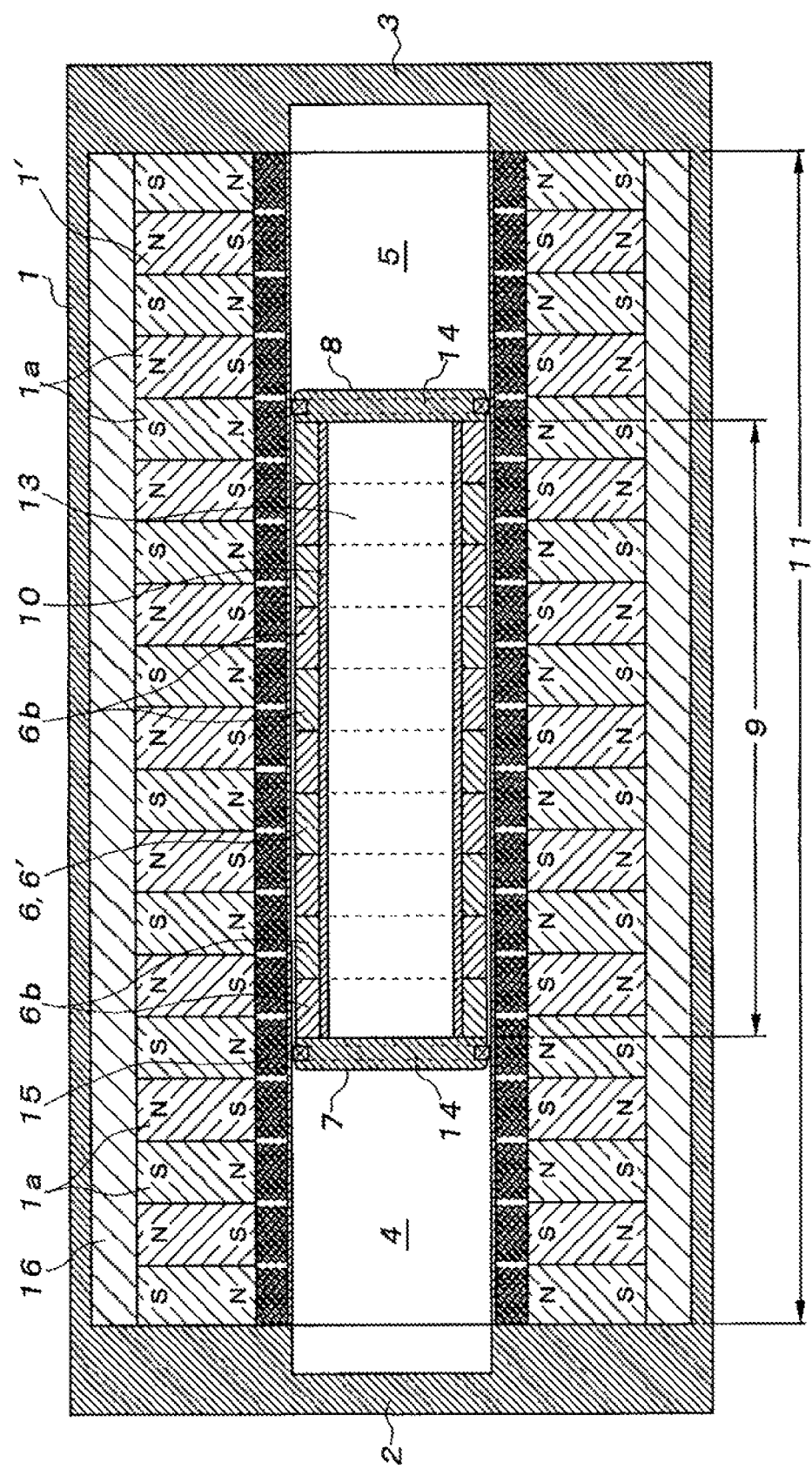

US 8,610,320 B2

LINEAR GENERATOR HAVING A FLUID PRESSURE CYLINDER STRUCTURE

TECHNICAL FIELD

The present invention relates to a linear generator that induces power generation between a piston and a cylinder constituting a fluid pressure cylinder.

BACKGROUND ART

Japanese Patent Application Laid-Open No. 2005-318708 discloses a power generation system in which a free-piston engine (a fluid pressure cylinder) and a linear generator cooperate with each other to generate power.

As with a cylinder structure of an automobile engine, the free-piston engine (fluid pressure cylinder) constituting the power generation system is a single-combustion chamber-type cylinder comprising a combustion chamber (a fluid pressure chamber) provided at only one end of a cylinder. The intake process, the compression process, and the exhaust process of the free-piston engine are carried out by moving a piston in only one direction by the fluid pressure generated by burning and explosion of fuel in the single combustion chamber, and moving the piston in the other direction by driving the linear generator as a motor. The output of power generation is taken out from the linear generator in the burning and explosion of the free-piston engine.

The linear power generation system according to Japanese Patent Application Laid-Open No. 2005-318708 has the structure in which the burning and explosion in the free-piston engine (the fluid pressure cylinder) comprising the single-combustion-chamber-type cylinder and the function of the linear generator as a motor cooperate with each other to reciprocate the piston of the free-piston engine in the axis direction, and the coil of the linear generator serves as a component of the motor and the generator. When the linear power generation system and a controller for controlling the linear power generation system are provided, there is a problem that the structure is complicated and the cost is high.

Further, since the piston is moved in one direction by the burning and explosion and moved in the other direction by the motor, there is a problem that the power generation is inefficient.

Furthermore, since the free-piston engine and the linear generator are connected in series, the size and length are increased, and thus an excessive occupied space is required.

SUMMARY OF THE INVENTION

In order to resolve the above problems, the present invention provides a linear generator which induces power generation between a piston and a cylinder constituting a fluid pressure cylinder.

In summary, the linear generator according to the present invention has a fluid pressure cylinder structure in which a fluid pressure in a left fluid-pressure chamber in contact with a left end wall of a cylinder and a fluid pressure in a right fluid-pressure chamber in contact with a right end wall of the cylinder are alternately applied to a piston in a cylinder to reciprocate the piston in the axis direction. The linear generator comprises a permanent magnet band and an electromotive coil band. The permanent magnet band is provided between a left pressure-receiving surface in contact with the left fluid-pressure chamber of the piston and a right pressure-receiving surface in contact with the right fluid-pressure chamber. The electromotive coil band provided over the left and right fluid-pressure chambers is formed on a cylindrical wall between the left and right end walls of the cylinder. The piston having the permanent magnet band reciprocates in the axis direction, whereby the power generation in the electromotive coil band is induced.

The left and right fluid-pressure chambers constitute combustion chambers, and the piston is moved in the axis direction by the fluid pressure generated by burning and explosion of fuel in the combustion chamber.

Alternatively, a high-pressure fluid is supplied alternately into the left and right fluid-pressure chambers from outside, and the piston is moved in the axis direction by the fluid pressure of the high-pressure fluid.

The piston may be constituted of a cylindrical permanent magnet, and the end opening surfaces of a tube hole of the cylindrical piston may be closed by pressure-receiving endplates so that the fluid pressure may be received by the pressure-receiving end plate.

The cylindrical piston is constituted of a single tube body comprising a permanent magnet or constituted by stacking a plurality of rings or short tube bodies each comprising a permanent magnet.

The present invention adopts as a basic structure a fluid pressure cylinder structure in which the fluid pressures in left and right fluid-pressure chambers at both ends of a cylinder are alternately applied to reciprocate a piston, and, at the same time, the present invention can realize the induction of power generation between the piston and the cylinder constituting the fluid pressure cylinder, the simplification of the structure of a generator, and the reduction in size and weight, whereby efficient power generation can be stably obtained.

Further, the piston has a cylindrical shape, and the fluid pressure is received by the pressure-receiving endplate to move the piston, whereby the weight of the piston can be reduced, and the smooth reciprocating movement and the induction of efficient power generation can be realized.

Furthermore, a permanent magnet of the piston can be effectively protected from impact and heat by the pressure-receiving end plate.

BRIEF DESCRIPTION OF THE DRAWINGS

FIG. 5 is a cross-sectional view showing an example in which a fixed permanent magnet tube body and a fixed cylindrical yoke are provided in the linear generator in the above examples;

FIG. 7B is a cross-sectional view showing a second operation of the linear generator which allows the piston to

DETAILED DESCRIPTION OF THE INVENTION

Figure 1:
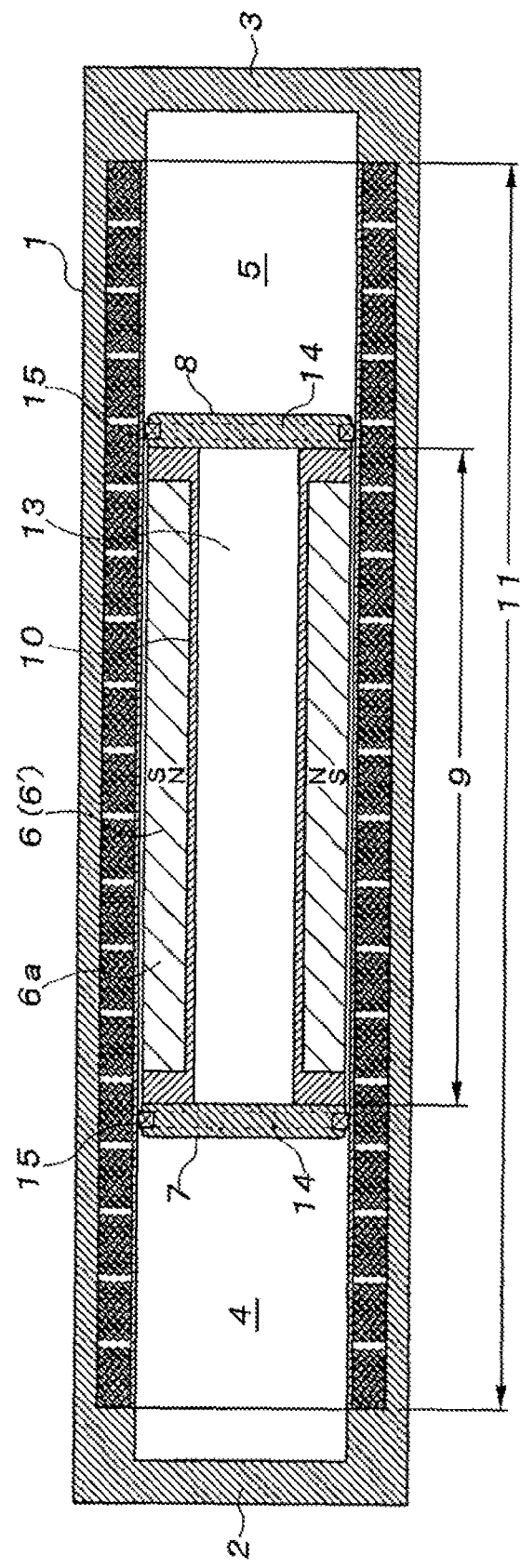
FIG. 1 is a cross-sectional view showing an example in which a piston (permanent magnet tube body) of a linear generator according to the present invention is constituted of a single tube body comprising a permanent magnet.

Hereinafter, preferred embodiments of the present invention will be described in detail based on FIGS. 1 to 7.

A linear generator according to the present invention has a fluid-pressure cylinder structure. In this structure, a fluid pressure in a left fluid pressure chamber 4 in contact with a left end wall 2 of a cylinder 1 and a fluid pressure in a right fluid pressure chamber 5 in contact with a right end wall 3 of the cylinder 1 are alternately applied to a piston (free piston) 6 in the cylinder 1 to reciprocate the piston 6 in the axis direction.

The cylinder 1 is constituted of a complete cylindrical and both-end-closed type tube body, where the left and right ends of the tube body are closed by the end walls 2 and 3, respectively. The cylinder 1 includes therein the piston (free piston) 6 movable in the axis direction. The left fluid pressure chamber 4 is defined by the left end cylindrical wall of the cylinder 1, the piston 6, and the left end wall 2. The right fluid pressure chamber 5 is defined by the right end cylindrical wall of the cylinder 1, the piston 6, and the right end wall 3.

The linear generator according to the present invention adopts the fluid-pressure cylinder structure, and, at the same time, a permanent magnet band 9 is provided between a left pressure-receiving surface 7 of the piston 6 in contact with the left fluid pressure chamber 4 and a right pressure-receiving surface 8 in contact with the right fluid pressure chamber 5, and an electromotive coil band 11 provided over the left and right fluid pressure chambers 4 and 5 is formed at the cylindrical wall between the left and right end walls 2 and 3 of the cylinder 1. The piston 6 having the permanent magnet band 9 reciprocates in the axis direction, whereby the power generation in the electromotive coil band 11 is induced.

The left and right fluid pressure chambers 4 and 5 constitute a combustion chamber, and the piston 6 is moved in the axis direction by the fluid pressure generated by burning and exploding fuel in the combustion chamber.

Alternatively, high-pressure fluids 20 and 20' are alternately supplied into the left and right fluid pressure chambers 4 and 5 from outside, and the piston 6 is moved in the axis direction by the fluid pressure of the high-pressure fluids 20 and 20'.

Figure 2:
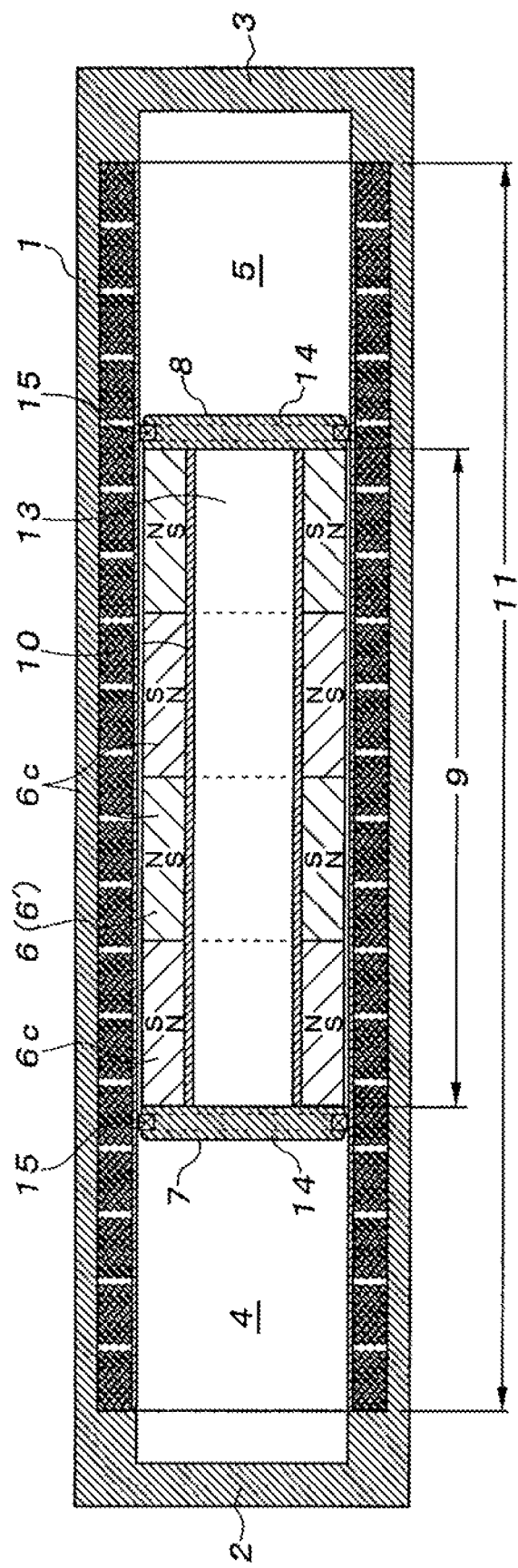
FIG. 2 is a cross-sectional view showing an example in which the piston (permanent magnet tube body) of the linear generator is constituted of a stack of short tube bodies comprising a permanent magnet.
Figure 3:
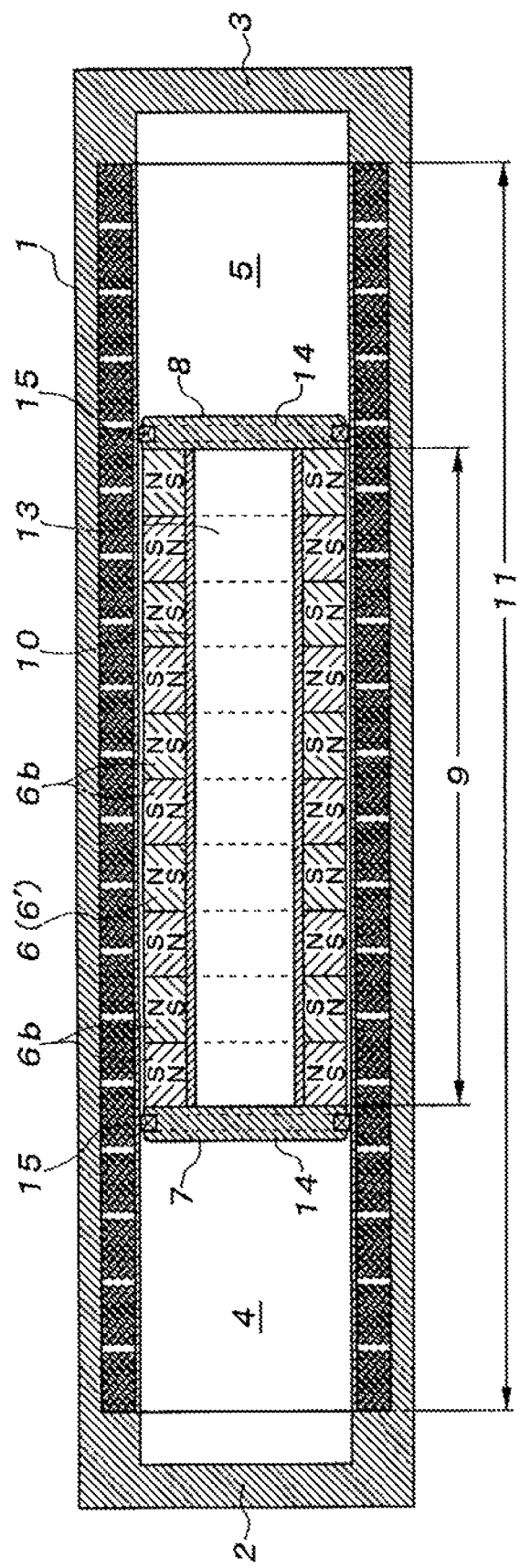
FIG. 3 is a cross-sectional view showing an example in which the piston (permanent magnet tube body) of the linear generator is constituted of a stack of rings comprising a permanent magnet.

As shown in FIGS. 1, 2, and 3, the piston 6 is constituted of a permanent magnet tube body 6'. Both end opening surfaces of a tube hole 13 of the permanent magnet tube body 6' are closed by pressure-receiving endplates 14, and the fluid pressure is received by the pressure-receiving end plates 14.

As a specific example, in the piston structure of FIG. 1, the cylindrical piston 6 is constituted of the permanent magnet tube body 6' comprising a single tube body 6a, the permanent magnet tube body 6' is externally inserted into a cylindrical yoke 10, and the end opening surfaces are closed by the pressure-receiving end plates 14.

In the piston structure of FIG. 2, the cylindrical piston 6 is constituted of the permanent magnet tube body 6' having a structure in which a plurality of short tube bodies 6c each comprising a permanent magnet are integrally and coaxially stacked. The permanent magnet tube body 6' is externally mounted on the cylindrical yoke 10, and the end openings are closed by the pressure-receiving end plates 14.

In the piston structure of FIG. 3, the cylindrical piston 6 is constituted of the permanent magnet tube body 6' having a structure in which a plurality of rings 6b each comprising a permanent magnet are integrally and coaxially stacked. The permanent magnet tube body 6' is externally mounted on the cylindrical yoke 10, and the end opening surfaces are closed by the pressure-receiving end plates 14.

Figure 4:
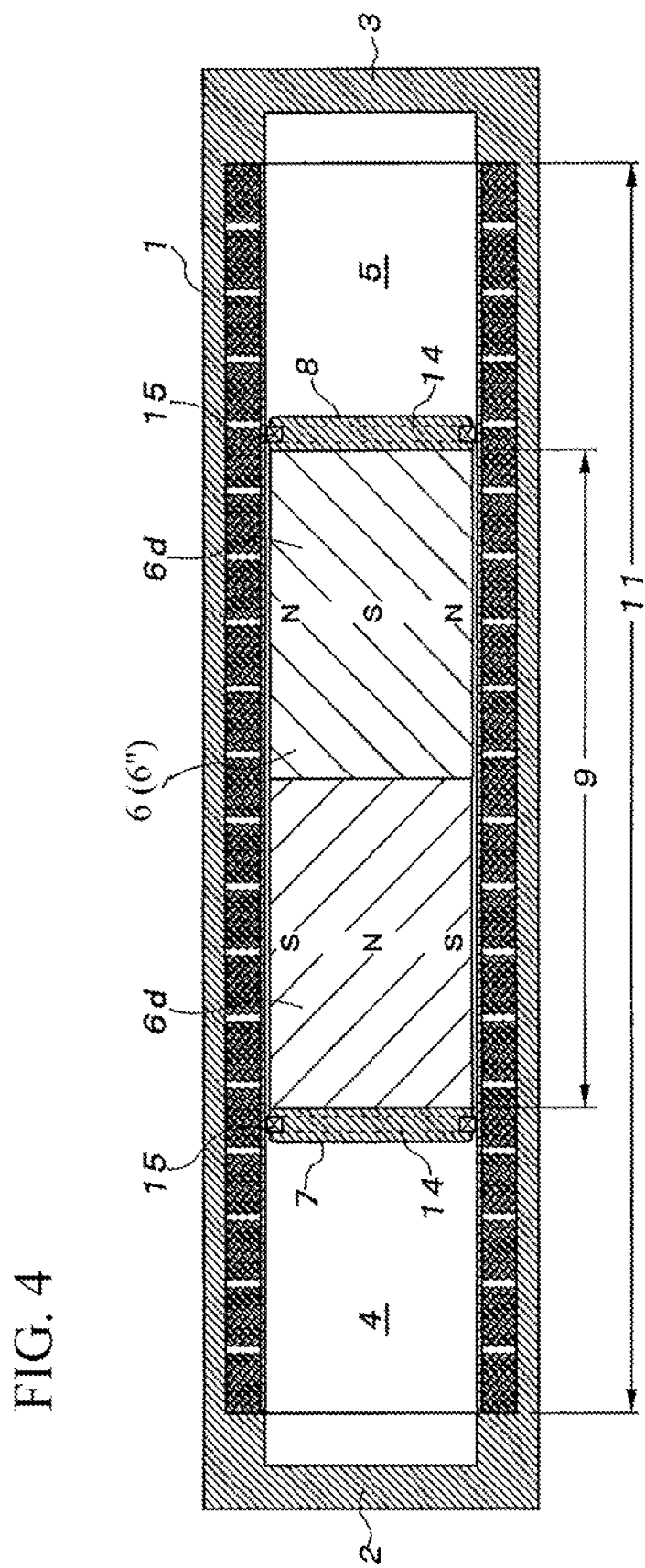
FIG. 4 is a cross-sectional view showing an example in which the piston (permanent magnet tube body) of the linear generator is constituted of short column bodies comprising a permanent magnet.

In the piston structure of FIG. 4, the piston 6 is constituted of a permanent magnet column body 6'' having a structure in which a plurality of short column bodies 6d each having a solid structure and comprising a permanent magnet are integrally and coaxially stacked, and the pressure-receiving end plates 14 are respectively provided on the end surfaces.

When the rings 6b or the short tube bodies 6c are stacked in the piston 6, the length of the piston 6 (the permanent magnet band 9) can be increased or decreased by increasing or decreasing the number of the stacked rings 6b or short tube bodies 6c.

It is preferable that the pressure-receiving end plates 14 described with reference to FIGS. 1 to 4 are each constituted of a heat-resistant plate such as a ceramic plate, a fiber plate, a stone plate, a concrete plate, a carbon plate, and a metal plate.

The permanent magnet tube body 6' and the permanent magnet column body 6'' have on their outer peripheries of both ends annular seals 15 for use in air-tight sealing with the inner periphery of the cylinder 1. Alternatively, the annular seals 15 are provided on the outer peripheries of the pressure-receiving end plates 14 closing the end opening surfaces of the cylindrical piston 6 constituted of the permanent magnet tube body 6'.

The permanent magnet tube body 6' and the permanent magnet column body 6'' have polarities in accordance with a known magnetic induction principle, and they are arranged so that the magnetic line of the permanent magnet is effectively applied to an electromotive coil in the electromotive coil band 11.

For example, the inner peripheral portion of the permanent magnet tube body 6' has a north pole (or a south pole), and the outer peripheral portion has a south pole (or a north pole).

Likewise, as shown in FIGS. 2 and 3, also when the short tube bodies 6c or the rings 6b are stacked to constitute the permanent magnet tube body 6', the inner peripheral portions of the short tube bodies 6c and the ring 6b can have a north pole (or a south pole), and the outer peripheral portions can have a south pole (or a north pole).

As a specific example, in FIG. 3, the ring 6b, in which the outer peripheral portion has a north pole and the inner peripheral portion has a south pole, and the ring 6b, in which the outer peripheral portion has a south pole and the inner peripheral portion has a north pole, are alternately stacked in the axis direction, so that the permanent magnet tube body 6' is constituted. Also when a plurality of the short tube bodies 6c of FIG. 2 are stacked to constitute the permanent magnet tube body 6', the short tube bodies 6c can be stacked so that the north and south poles are alternately arranged.

In FIG. 4, the short column bodies 6d, in which the center core has a south pole and the outer peripheral portion has a north pole, and the short column bodies 6d, in which the center core has a north pole and the outer peripheral portion has a south pole, are stacked in the axis direction.

The electromotive coil constituting the electromotive coil band 11 may be constituted of a plurality of unit electromotive coil groups in accordance with the pole arrangement in the above examples.

Needless to say, all the short tube bodies 6c, the rings 6b, or the short column bodies 6d constituting the permanent magnet tube body 6' and the permanent magnet column body 6" may be stacked so that the outer peripheral portion and the inner peripheral portion respectively have the same poles.

In an embodiment of FIG. 5, the piton 6 is constituted of the permanent magnet tube body 6' (or the permanent magnet column body 6"), and, at the same time, the cylinder 1 is provided with the fixed permanent magnet tube body 1' annularly surrounding the outer periphery of the electromotive coil band 11, so that the electromotive coil can generate power more efficiently.

In the embodiment of FIG. 5, a fixed cylindrical yoke 16 annularly surrounding the outer periphery of the fixed permanent magnet tube body 1' is further provided.

The fixed permanent magnet tube body 1', the fixed cylindrical yoke 16 surrounding the fixed permanent magnet tube body 1', the permanent magnet tube body 6' or the permanent magnet column body 6" constituting the piston 6, and the cylindrical yoke 10 on which the permanent magnet tube body 6' is externally mounted enhance the power generation efficiency in cooperation with one another.

As shown in FIG. 5 as an example, a large number of permanent magnet rings 1a are stacked to constitute the fixed permanent magnet tube body 1', the electromotive coil in the electromotive coil band 11 is annularly surrounded by the fixed permanent magnet tube body 1', and the permanent magnet tube body 6' constituting the piston 6 is further annularly surrounded through the electromotive coil band 11.

In other words, the permanent magnet tube bodies 6' and 1' are arranged on the inner periphery and the outer periphery of the electromotive coil in the electromotive coil band 11, and the electromotive coil is nipped between the permanent magnet tube bodies 6' and 1'.

The permanent magnet rings 1a constituting the fixed permanent magnet tube body 1' and the permanent magnet rings 6b constituting the piston 6 are respectively stacked so that the adjacent rings 1a and 6b have opposite polarities to each other as shown in FIGS. 3 and 5, for example.

Also when the permanent magnet tube body 6' (the piston 6) is constituted of the short tube bodies 6c shown in FIG. 2, a plurality of permanent magnet short tube bodies may be stacked to provide the fixed permanent magnet tube body 1', the permanent magnet tube body 6' constituting the piston 6 may be annularly surrounded by the fixed permanent magnet tube body 1', and the short tube bodies of the tube bodies 1' and 6' may be arranged so that the adjacent short tube bodies have opposite polarities to each other.

In the examples of FIGS. 1 to 4, the fixed permanent magnet tube body 1' surrounding the electromotive coil band 11 may be provided. When the fixed permanent magnet tube body 1' is provided, the thickness of the permanent magnet tube body 6' constituting the piston 6 may be reduced, and the diameter of the permanent magnet column body 6" of the piston 6 may also be reduced, whereby the piston 6 can be further reduced in weight.

As described above, when the left and right fluid-pressure chambers 4 and 5 constitute the combustion chamber, for example, spark plugs 19 are provided on the left and right end walls 2 and 3, fuel injection valves 17 are provided on the left and right end walls 2 and 3 or on the left and right end cylindrical walls of the cylinder 1, and an exhaust valve 18 is provided on the left and right end walls 2 and 3, the left and right end cylindrical walls, or an intermediate portion of the cylindrical wall of the cylinder 1.

Hereinafter, based on FIGS. 6A to 6D, an operation when the left and right fluid-pressure chambers 4 and 5 constitute left and right combustion chambers will be described.

Figure 6A:
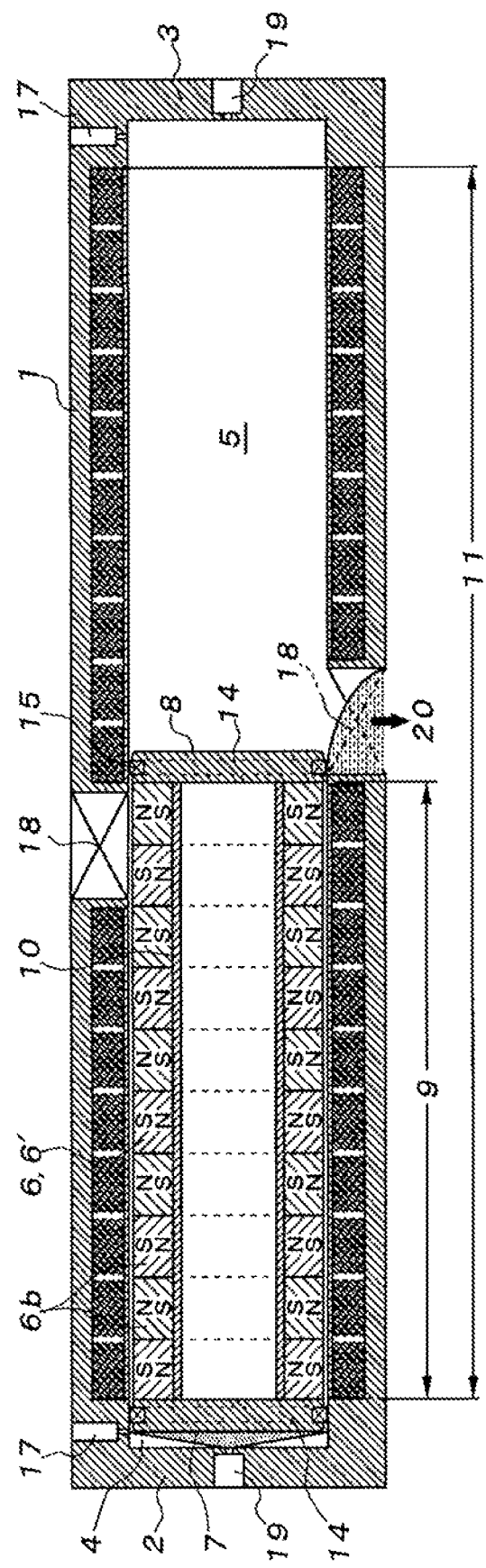
FIG. 6A is a cross-sectional view showing a first operation of the linear generator which allows the piston to be driven by burning and explosion of fuel.
Figure 6B:
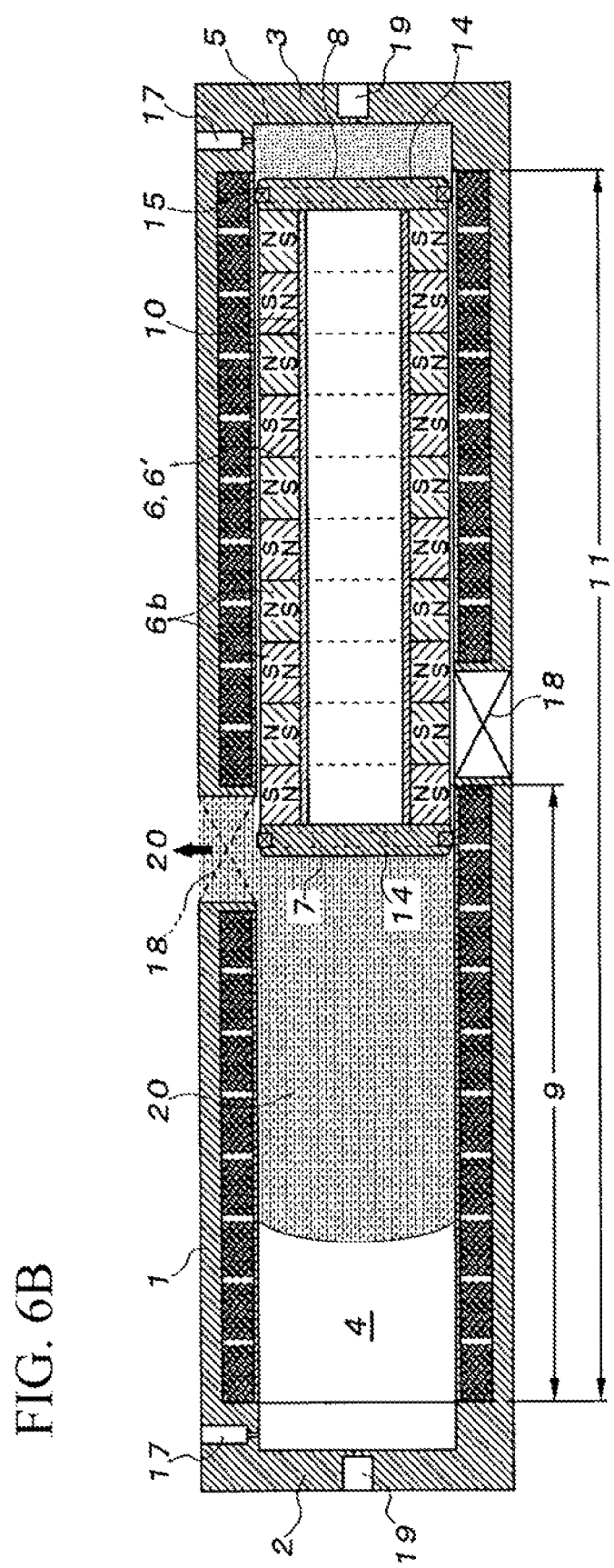
FIG. 6B is a cross-sectional view showing a second operation of the linear generator which allows the piston to be driven by burning and explosion of fuel.

As shown in FIGS. 6A and 6B, compressed fuel in the left combustion chamber 4 supplied by the left side spark plug 19 through the fuel injection valve 17 is burned and exploded, whereby the fluid pressure is applied to the left pressure-receiving surface 7 of the pressure-receiving endplate 14, and the piston 6 (the permanent magnet tube body 6' or the permanent magnet column body 6") is moved rightward on the axis line.

Figure 6C:
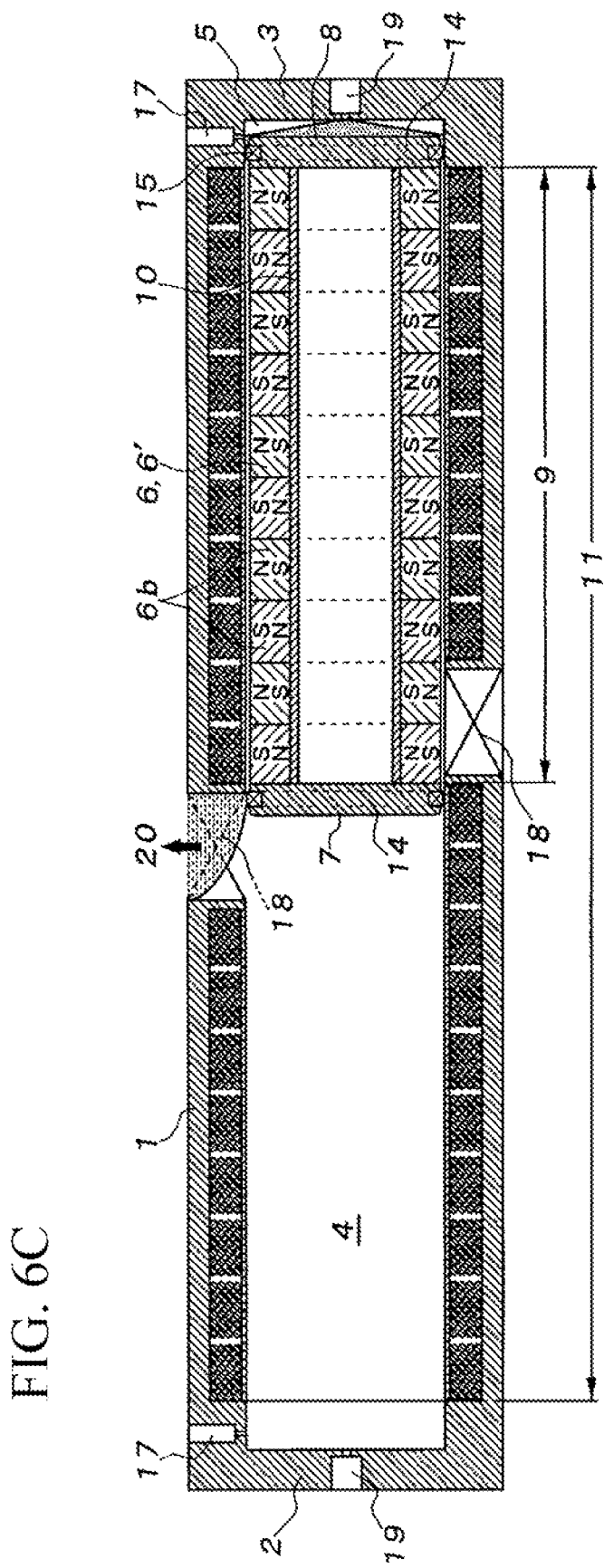
FIG. 6C is a cross-sectional view showing a third operation of the linear generator which allows the piston to be driven by burning and explosion of fuel.
Figure 6D:
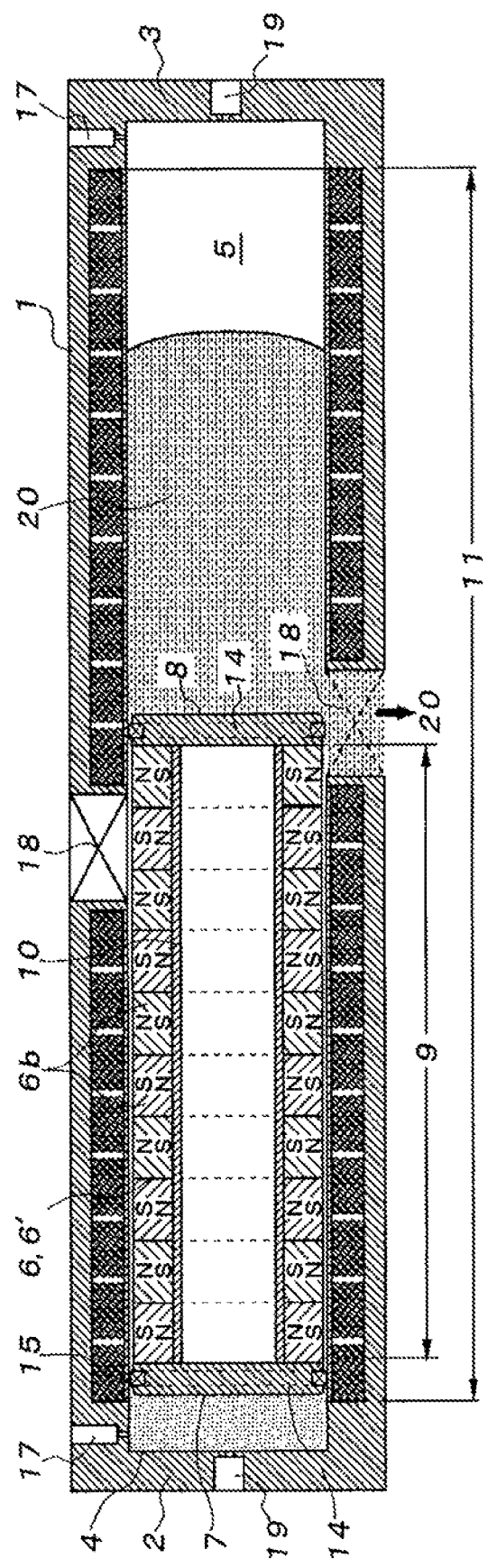
FIG. 6D is a cross-sectional view showing a fourth operation of the linear generator which allows the piston to be driven by burning and explosion of fuel.

As shown in FIGS. 6C and 6D, the piston 6 is moved rightward as described above, whereby the fuel (a mixture with gas) injected in the right combustion chamber 5 through the right side fuel injection valve 17 is compressed, then ignited by the right spark plug 19, and, thus, burned and exploded in the right combustion chamber 5. As a result, the fluid pressure is applied to the right pressure-receiving surface 8 of the pressure-receiving end plate 14, and the piston 6 (the permanent magnet tube body 6' or the permanent magnet column body 6") is moved leftward on the axis line.

A fluid (combustion gas) 20 generated by the burning and explosion of the fuel in the left and right fluid-pressure chambers 4 and 5 is exhausted through the exhaust valve 18 accompanying the reciprocating movement of the piston 6.

The above operation is repeated, whereby the permanent magnet tube body 6' or the permanent magnet column body 6" (the permanent magnet band 9) constituting the piston 6 repeatedly reciprocates, and the power generation in the electromotive coil band 11 is induced.

Figure 7A:
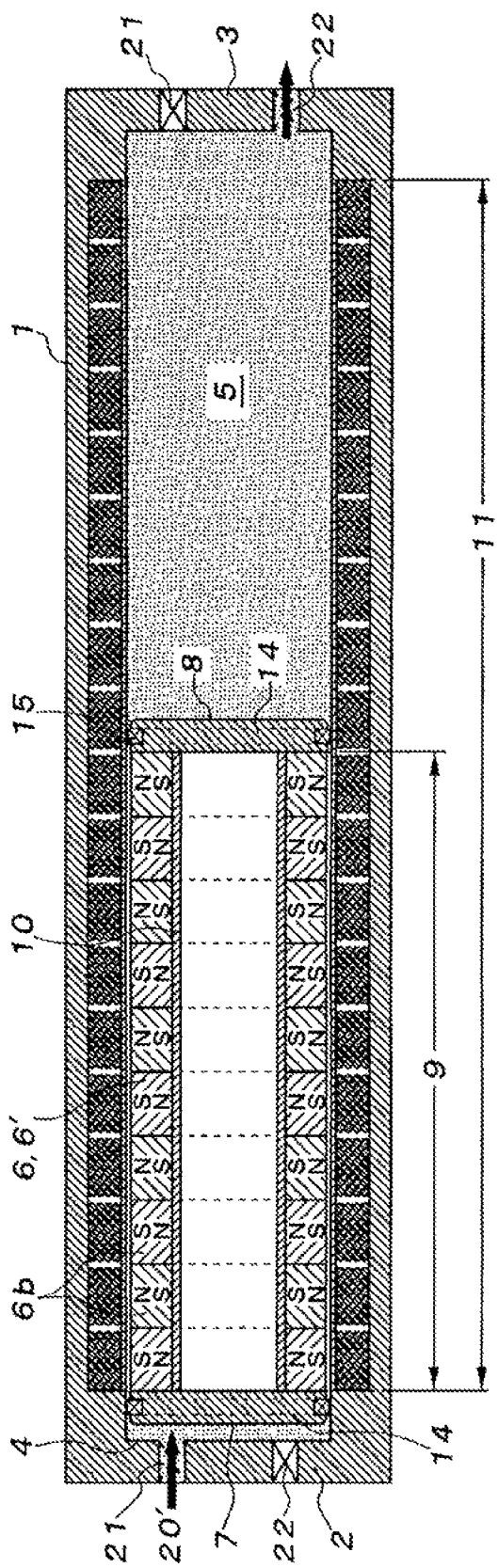
FIG. 7A is a cross-sectional view showing a first operation of the linear generator which allows the piston to be driven by a high-pressure fluid supplied from outside.

Next, based on FIGS. 7A and 7B, an embodiment in which a high-pressure fluid is supplied into the left and right fluid pressure chambers 4 and 5 from outside to reciprocate the piston 6 will be described. As a high-pressure fluid 20', various gases may be used in addition to air and steam.

For example, fluid supply values 21 and exhaust vales 22 are provided on the left and right end walls 2 and 3. As shown in FIG. 7A, the high-pressure fluid 20' is supplied into the left fluid pressure chamber 4 through the left fluid supply valve 21, whereby the fluid pressure of the high-pressure fluid 20' is applied to the left pressure-receiving surface 7 of the pressure-receiving end plate 14, and the piston 6 (the permanent magnet tube body 6' or the permanent magnet column body 6") is moved rightward on the axis line.

Figure 7B:
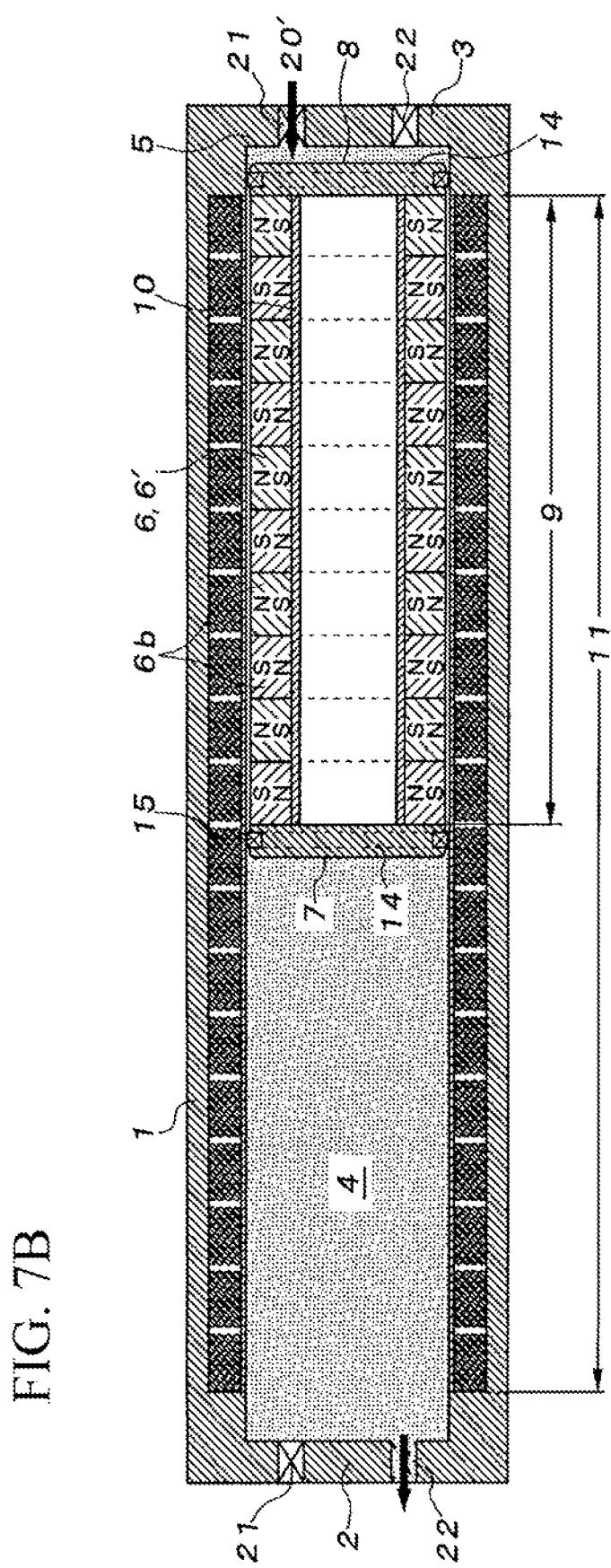

Next, as shown in FIG. 7B, when the piston 6 reaches the tail end of the rightward movement, the high-pressure fluid 20' is supplied into the right combustion chamber 5 through the right fluid supply valve 21, whereby the fluid pressure of the high-pressure fluid 20' is applied to the right pressure-receiving surface 8 of the pressure-receiving endplate 14, and the piston 6 (the permanent magnet tube body 6' or the permanent magnet column body 6") is moved leftward on the axis line.

The above operation is repeated, whereby the permanent magnet tube body 6' or the permanent magnet column body 6" (the permanent magnet band 9) constituting the piston 6 repeatedly reciprocates to induce the power generation in the electromotive coil band 11.

The invention claimed is:

1. A linear generator having a fluid pressure cylinder structure, comprising a cylinder having left and right end walls, and a piston reciprocally disposed in the cylinder and having left and right pressure-receiving surfaces such that a left fluid chamber is defined in the cylinder between the left end wall of the cylinder and the left pressure-receiving surface of the piston and a right fluid chamber is defined in the cylinder between the right end wall of the cylinder and the right pressure-receiving surface of the piston, in which a fluid pressure in the left fluid pressure chamber and a fluid pressure in the right fluid pressure chamber are to be alternately applied to the piston in the cylinder to reciprocate the piston in the axis direction, the linear generator further comprising:

a permanent magnet band provided between the left pressure-receiving surface of the piston and the right pressure-receiving surface of the piston;

an electromotive coil band provided over the left and right fluid pressure chambers and formed on a cylindrical wall between the left and right end walls of the cylinder;

a fixed permanent magnet tube body disposed radially outwardly of an outer periphery of the electromotive coil band; and a fixed cylindrical yoke disposed radially outwardly of an outer periphery of the fixed permanent magnet tube body;

wherein the piston having the permanent magnet band is arranged to reciprocate in the axis direction to induce power generation in the electromotive coil band; and wherein the fixed permanent magnet tube body annularly surrounds an outer periphery of the electromotive coil band, and the fixed cylindrical yoke annularly surrounds an outer periphery of the fixed permanent magnet tube body.

2. The linear generator according to claim 1, wherein the left and right fluid pressure chambers constitute combustion chambers, and the piston is configured to be moved in the axis direction by the fluid pressure generated by burning and explosion of fuel in the combustion chamber.

3. The linear generator according to claim 2, wherein the piston has a cylindrical shape with a tube hole therethrough, and end opening surfaces of the tube hole of the cylindrical piston are closed by left and right pressure-receiving end plates that define the left and right pressure-receiving surfaces, respectively.

4. The linear generator according to claim 1, wherein the cylinder is configured to enable a high-pressure fluid to be supplied alternately into the left and right fluid pressure chambers from outside, and the piston is configured to be moved in the axis direction by the fluid pressure of the high-pressure fluid.

5. The linear generator according to claim 4, wherein the piston has a cylindrical shape with a tube hole therethrough, and end opening surfaces of the tube hole of the cylindrical piston are closed by left and right pressure-receiving end plates that define the left and right pressure-receiving surfaces, respectively.

6. The linear generator according to claim 1, wherein the piston has a cylindrical shape with a tube hole therethrough, and end opening surfaces of the tube hole of the cylindrical piston are closed by left and right pressure-receiving end plates that define the left and right pressure-receiving surfaces, respectively.

7. The linear generator according to claim 6, wherein the cylindrical piston is constituted by a stacked plurality of rings or short tube bodies each made of a permanent magnet.

* * * * *